United States Patent [19]

Shieh

[11] Patent Number: 5,896,126

[45] Date of Patent: Apr. 20, 1999

[54] SELECTION DEVICE FOR TOUCHSCREEN SYSTEMS

[75] Inventor: Johnny Meng-Han Shieh, Austin, Tex.

[73] Assignee: International Business Machines Corporation, Armonk, N.Y.

[21] Appl. No.: 08/705,026

[22] Filed: Aug. 29, 1996

[51] Int. Cl.[6] .................................................. G09G 5/00
[52] U.S. Cl. ................................... 345/173; 345/179
[58] Field of Search ............................... 345/173, 175, 345/177, 178, 179

[56] References Cited

U.S. PATENT DOCUMENTS

| | | | |
|---|---|---|---|
| 4,914,624 | 4/1990 | Dunthorn | 345/173 |
| 5,341,133 | 8/1994 | Savoy et al. | 341/22 |
| 5,432,671 | 7/1995 | Allavena | 361/280 |
| 5,438,433 | 8/1995 | Reifman et al. | 358/468 |
| 5,483,261 | 1/1996 | Yasutake | 345/173 |
| 5,565,894 | 10/1996 | Bates et al. | 345/173 |
| 5,612,719 | 3/1997 | Beernink et al. | 345/173 |
| 5,691,748 | 11/1997 | Fukuzaki | 345/179 |

*Primary Examiner*—Jeffery A. Hofsass
*Assistant Examiner*—John Tweel, Jr.
*Attorney, Agent, or Firm*—Richard A. Henkler; Andrew J. Dillon

[57] ABSTRACT

An apparatus, method, and memory direct a computer system, having at least a processor, memory, and touchscreen device (e.g., a touchscreen or a touchpad and display device) to execute at least one action on an object and/or text. The method includes detecting at least one item (e.g., fingers, stylus) placed on the touchscreen device, counting the number of items placed on the touchscreen device, determining if an associated action corresponds to the numbers of items and, if an associated action corresponds to the number of items, executing the associated action.

15 Claims, 6 Drawing Sheets

SELECTION DEVICE FOR TOUCHSCREEN SYSTEMS

BACKGROUND OF THE INVENTION

1. Field of the Invention

The present invention relates to touchscreen systems and, more particularly, but without limitation, pointers for touchscreen systems.

2. Background Information and Description of the Related Art

Conventionally, users interface with the desktop and operating system of their computer system using a "mouse". Typically, the mouse has one or more push buttons on its top and a roller on its bottom designed to roll along a surface next to the computer system. When the user moves the mouse's roller on the surface, a mouse pointer positioned on the computer system's display tracks the movement of the mouse's roller. When the user has positioned the pointer at a desirable location, such as over an object, the user clicks or multiple clicks, depending on how the mouse is programmed, one of the mouse push buttons to invoke or open the object.

Conventional mice suffer certain disadvantages and limitations. For example, mice are bulky, fixed in size so that very small hands or very large hands alike do not properly fit over the mice, not permanently attached to the computer system, subject to corrosion, and require the user to know the specific mouse behavior (e.g., which mouse button and how many clicks invoke a function). Accordingly, many customer oriented systems (e.g., ATM machines) and multi-user systems do not use mice. Rather, the trend for multi-user systems is to use touchscreens.

Conventional touchscreens allow the user's finger or a stylus, collectively referred to as "selection device", to replace the conventional mouse and mouse cursor. Conventional touchscreens utilize, for example, heat sensitive, sound sensitive, pressure sensitive, or motion sensitive grids/detectors to detect a hand, finger, or object placed on the touchscreen. Using current touchscreen technology, a user can initiate the display of a large pull down menu by touching the touchscreen, and then selecting an object within that large menu by dragging a finger down the menu.

However, conventional selection devices for touchscreens suffer certain limitations and disadvantages. Unlike a mouse cursor, fingers vary in size. Therefore, the desktop must place contiguous object icons and text far apart to accommodate sensing of the largest fingers. This presents a problem when the touchscreen is restricted in size. Further, some computer systems, such as laptops, only accommodate a touchpad, not a large touchscreen. A touchpad is a very small touchscreen used to manipulate objects and text displayed on a separate conventional display screen. To do so, the user positions one or more fingers on the touchpad to manipulate a conventional mouse cursor on the display screen. However, it is difficult to control and manipulate the position and placement of the mouse cursor using the touchpad.

There would be great demand for a new selection device for touchscreen technology that allows object icons and text to be placed close to one another, requires minimal space to perform functions on those object icons and text, and does not require the use of a mouse cursor.

SUMMARY

Accordingly, an apparatus, method, and memory direct a computer system, having at least a processor, memory, and touchscreen device (e.g., a touchscreen, or a touchpad and display device) to execute at least one action on an object and/or text. The method includes the steps of detecting at least one item (e.g., fingers, stylus) placed on the touchscreen device, counting the number of items placed on the touchscreen device, determining if an associated action corresponds to the number of counted items, and if an associated action corresponds to the number of counted items, executing the associated action.

Therefore, it is an object of the present invention to create a new selection device for touchscreens that allows objects to be positioned close together.

It is a further object to allow the selection device to operate with a touchscreen or a touchpad.

It is another object to allow mere positioning of one or more fingers on the touchscreen/touchpad to invoke an action, such as displaying a menu.

It is yet another object to create a selection device for touchscreens that does not require the use of a conventional mouse cursor.

These and other objects will become even more apparent in light of the following drawings and detailed description.

DETAILED DESCRIPTION OF THE PREFERRED EMBODIMENTS

Figure 1:
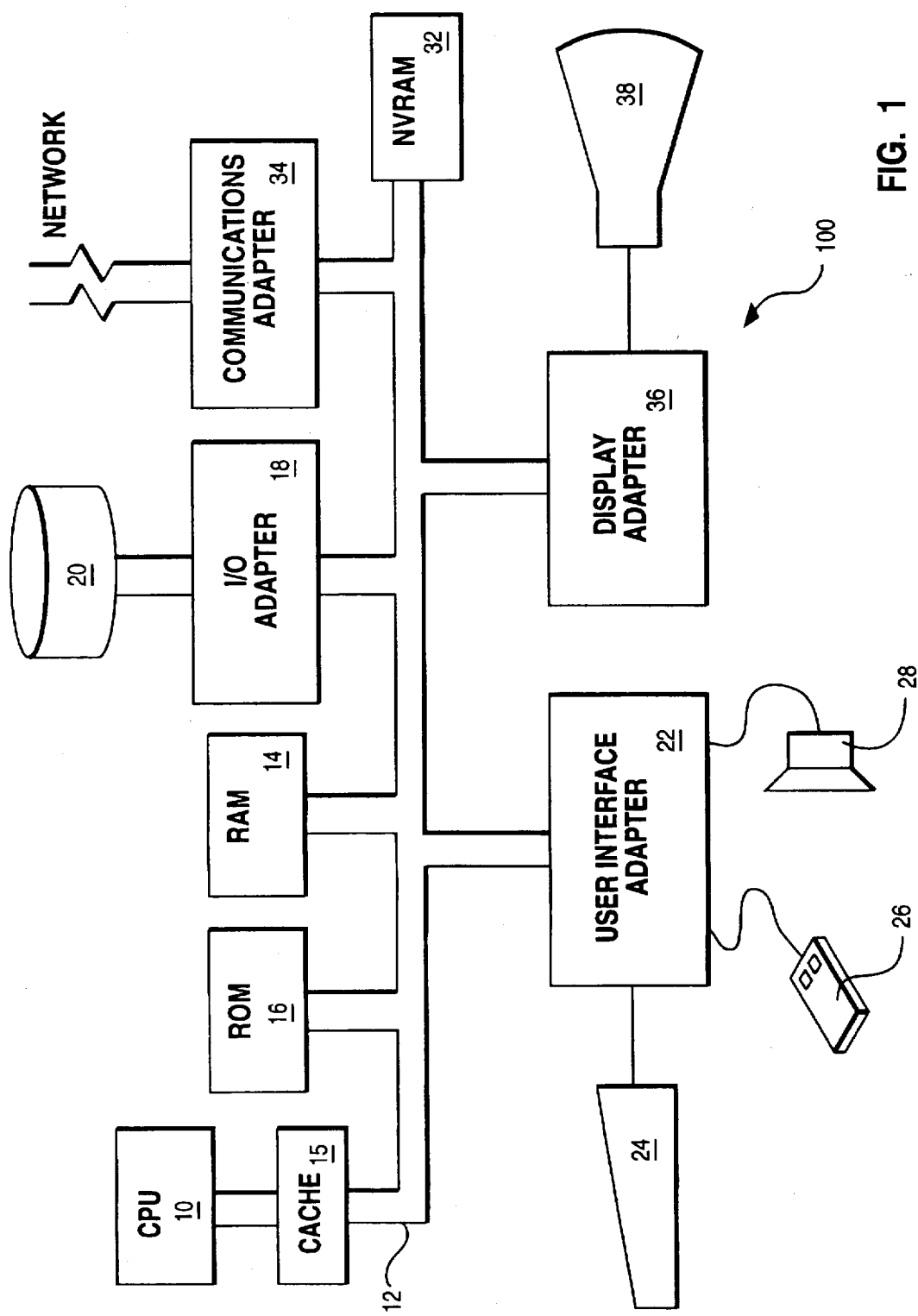
FIG. 1 illustrates a conventional hardware configuration for use with the present invention.

The preferred embodiments may be practiced in any suitable hardware configuration that uses a touchscreen and/or a touchpad, such as computing system 100 illustrated in FIG. 1 or, alternatively, in a laptop or notepad computing system. Computing system 100 includes any suitable central processing unit 10, such as a standard microprocessor, and any number of other objects interconnected via system bus 12. For purposes of illustration, computing system 100 includes memory, such as read only memory (ROM) 16, random access memory (RAM) 14, and peripheral memory devices (e.g., disk or tape drives 20) connected to system bus 12 via I/O adapter 18. Computing system 100 further includes a touchscreen display adapter 36 for connecting system bus 12 to a conventional touchscreen display device 38. Also, user interface adapter 22 could connect system bus 12 to other user controls, such as keyboard 24, speaker 28, mouse 26, and a touchpad (not shown).

One skilled in the art readily recognizes how conventional touchscreens and touchpads operate, how conventional touchscreen and touchpad device drivers communicate with an operating system, and how a user conventionally utilizes a touchscreen and touchpad to initiate the manipulation of objects in a graphical user interface. For example, touchscreen/touchpad technology includes electronic sensors positioned inside a flexible membrane covering a screen, a grid of infrared signals, or a method of detecting a touch by sensing a change in reflected sound waves through glass or plastic. Using current touchpad technology, a user can initiate the display of a pull down menu by touching and moving a finger over the touchpad to move a mouse cursor on a display screen. The user can then select an object within that menu by dragging the mouse cursor down the pull down menu by moving his finger in a downward motion on the touchpad.

A graphical user interface (GUI) and operating system (OS) of the preferred embodiment reside within a computer-readable media and contain a touchscreen and/or touchpad device driver that allows one or more users to initiate the manipulation of displayed object icons and text on a touchscreen or a conventional display device that is controlled by a touchpad. A touchscreen and touchpad are collectively referred to as a "touchscreen device". Any suitable computer-readable media may retain the GUI and operating system, such as ROM 16, RAM 14, disk and/or tape drive 20 (e.g., magnetic diskette, magnetic tape, CD-ROM, optical disk, or other suitable storage media).

In the preferred embodiments, the COSE™ (Common Operating System Environment) desktop GUI interfaces the user to the AIX™ operating system. The GUI may be viewed as being incorporated and embedded within the operating system. Alternatively, any suitable operating system or desktop environment could be utilized. Examples of other GUIs and/or operating systems include XII™ (X Windows) graphical user interface, Sun's Solaris™ operating system, and Microsoft's Windows 95™ operating system. While the GUI and operating system merely instruct and direct CPU 10, for ease in explanation, the GUI and operating system will be described as performing the following features and functions.

Figure 2:
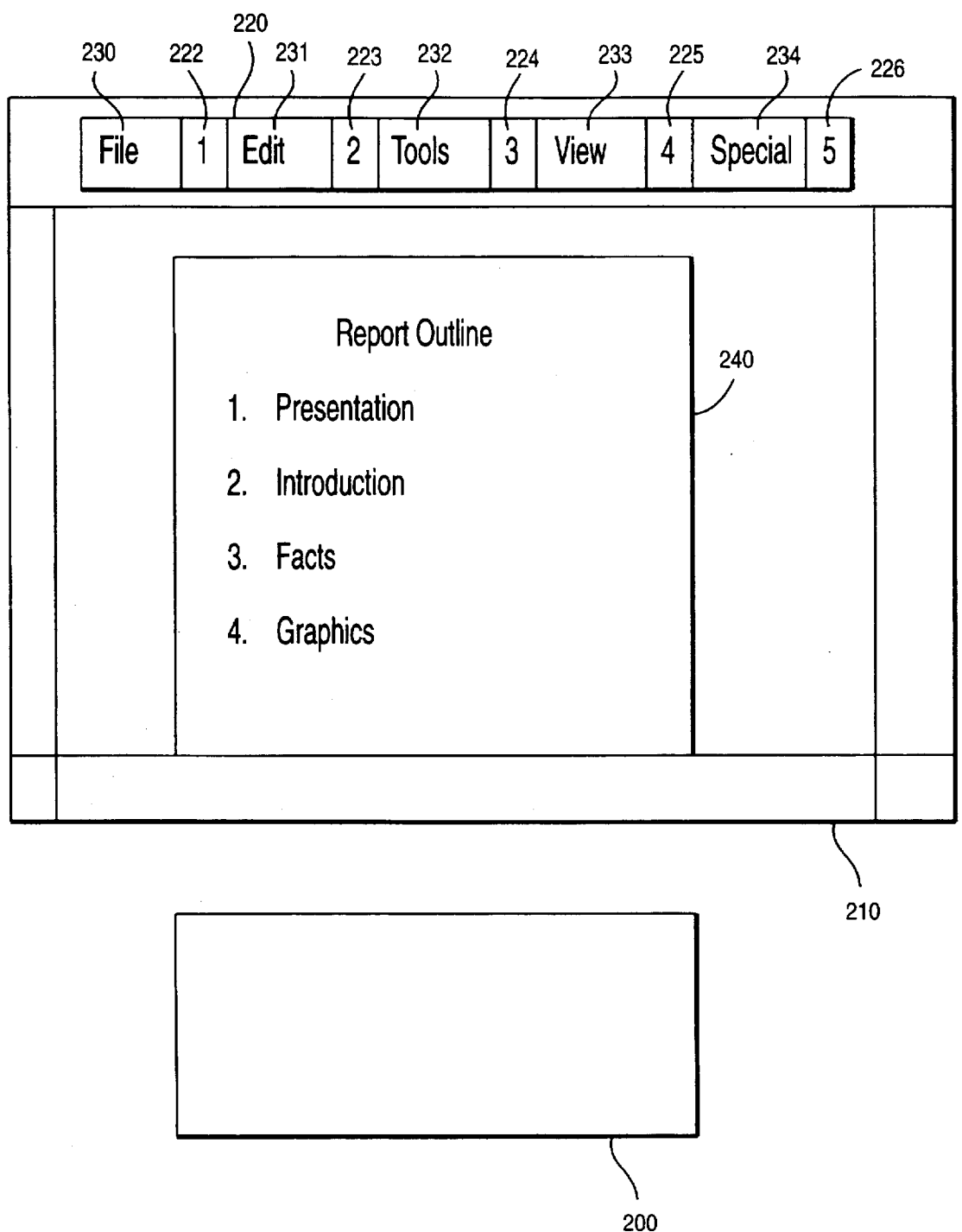
FIG. 2 illustrates a selection device in accordance with the present invention.

Referring to FIG. 2, a computer system (e.g., see FIG. 1) includes a display screen 210 for displaying document 240. The computer system further includes conventional touchpad 200 which is sensitive to, for example, heat, pressure, or the sound of palm and fingerprints. Alternatively, display screen 210 and touchpad 200 could be replaced with one conventional touchscreen. While any suitable touchscreen technology may be used, for ease in explanation, the preferred embodiment will be described as using a touchpad that detects sound patterns.

The OS displays menu bar 220, which includes various conventional selections 230–234. Next to each selection is a box containing a number. The number corresponds to the number of fingers needed to invoke the selection. For example, box 222 indicates that one finger would need to be placed on touchpad 200 to select "file" 230. Similarly, box 225 indicates that 4 fingers would need to be simultaneously placed on touchpad 200 to select "view" 233. The number placed in each box is user programmable, and may be in any order. Further, the user can use up to ten fingers to make selections. For more than ten selections, the user could use a stylus, or some other conventional means for selection.

Figure 3:
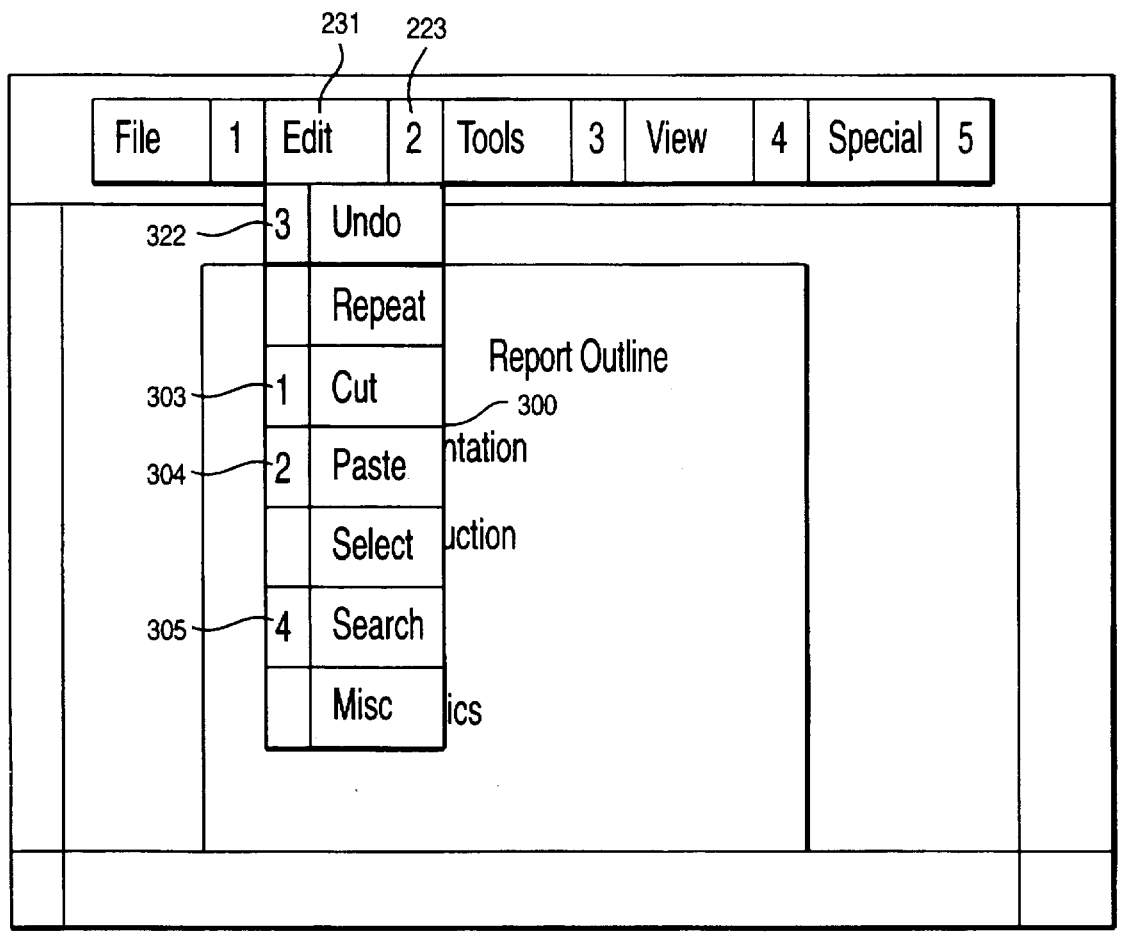
FIG. 3 illustrates a view of the selection device illustrated in FIG. 2.
Figure 3:
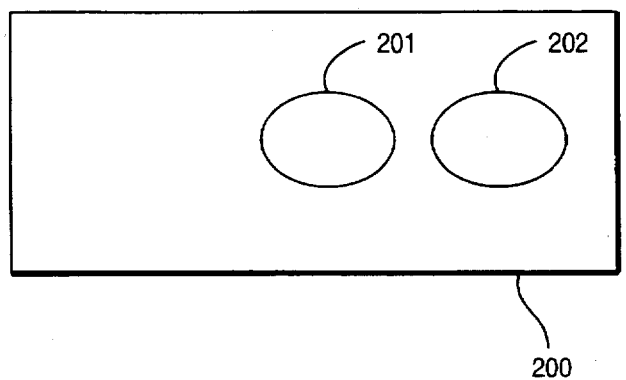

FIG. 3 illustrates a user having placed two fingers 201 and 202 on touchpad 200. In response, the OS displays drop-down "edit" menu 300 because two fingers corresponds to "edit" 231 (see box 223). Now that drop-down "edit" menu 300 has been invoked, boxes 302–305 display numbers representing the number of fingers/thumb that must be placed on touchpad 200 to invoke a selection in menu 300. For example, box 303 indicates that one finger must be placed on touchpad 200 to invoke a "cut" menu.

Figure 4:
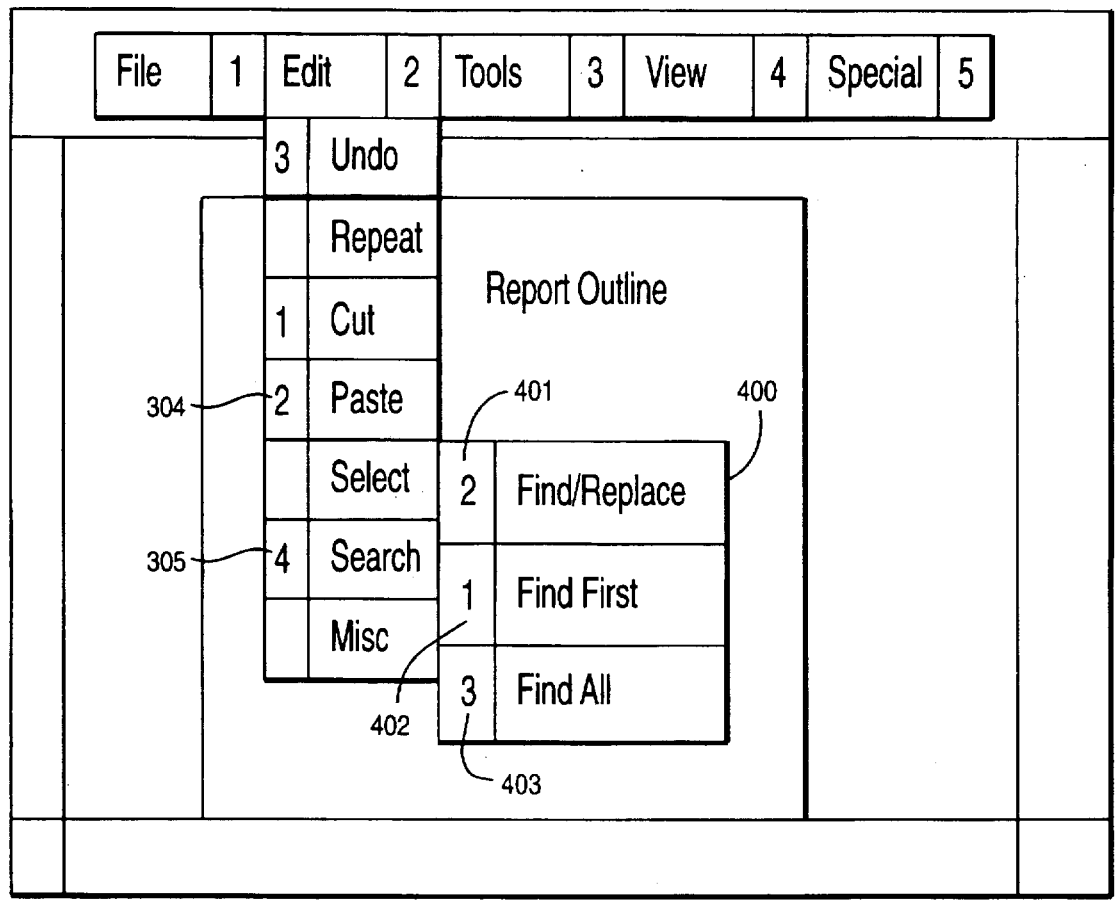
FIG. 4 illustrates another view of the selection device.
Figure 4:
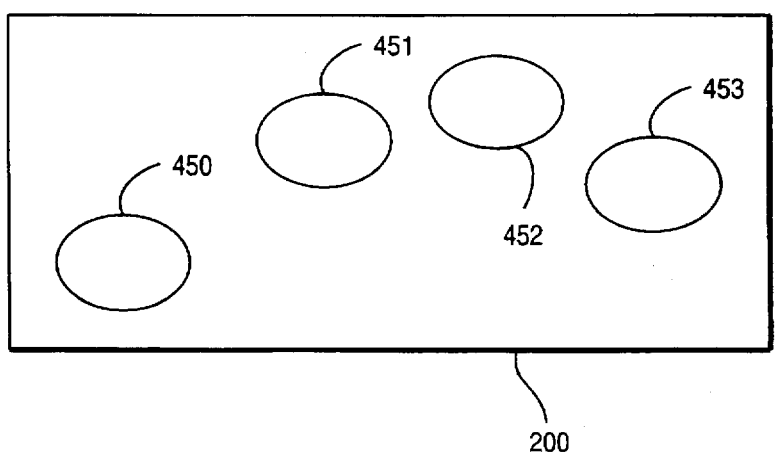

Referring to FIG. 4, in response to the user simultaneously placing four fingers 450–453 on touchpad 200, the OS displays drop-down "search" menu 400. Box 305 informed the user that four fingers would invoke a menu for the "search" selection. Once again, boxes 401–403 contain numbers indicating the number of fingers that must be placed on touchpad 200 to invoke the corresponding selection.

Figure 5:
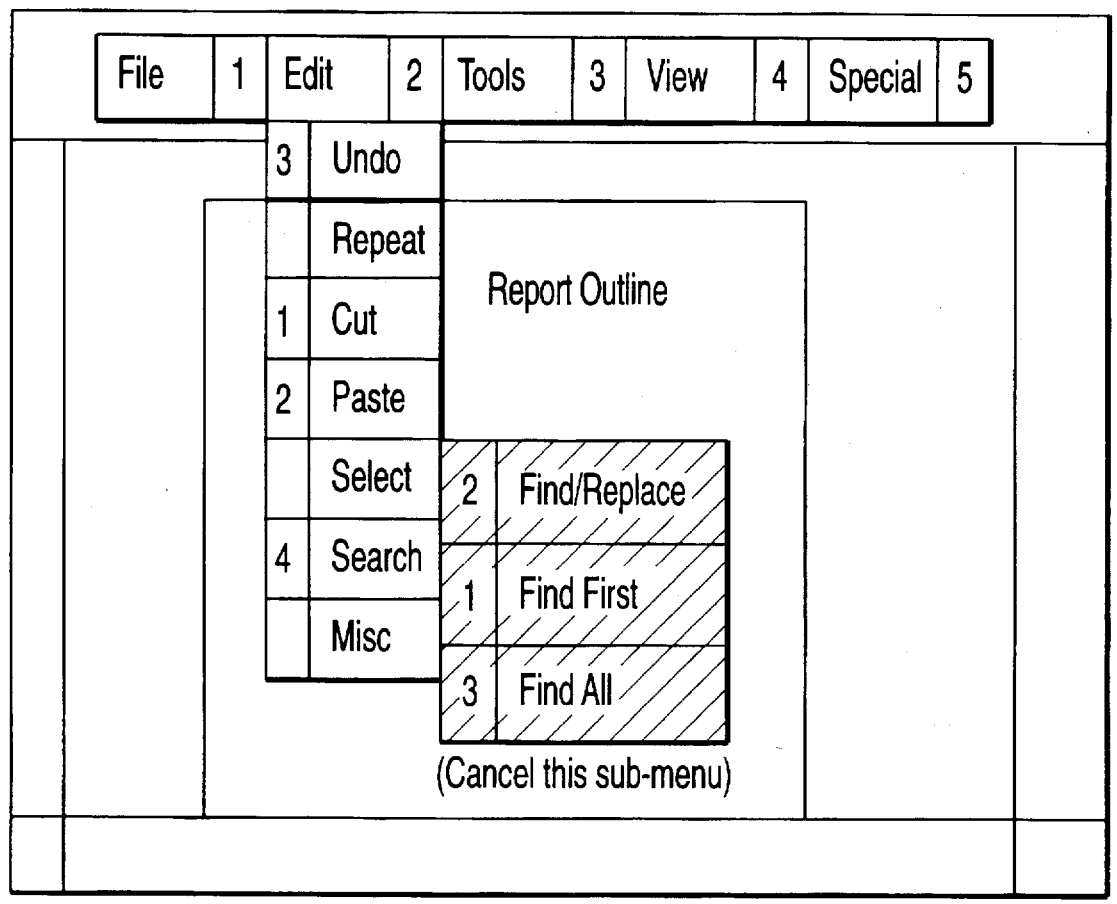
FIG. 5 illustrates a variation of the selection device illustrated in FIG. 2.
Figure 5:
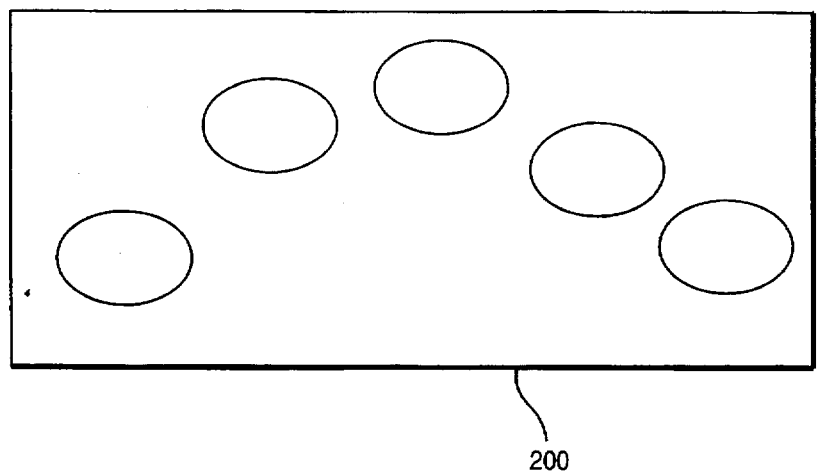

Referring to FIG. 5, if the user desires to cancel the previous selection, the user merely simultaneously places more fingers than are defined, or there may exist a "cancel this menu" option built into the menu. In FIG. 5, the cancel is accomplished by placing five fingers on touchpad 200. In response, the previous selection will be cancelled.

Figure 6:
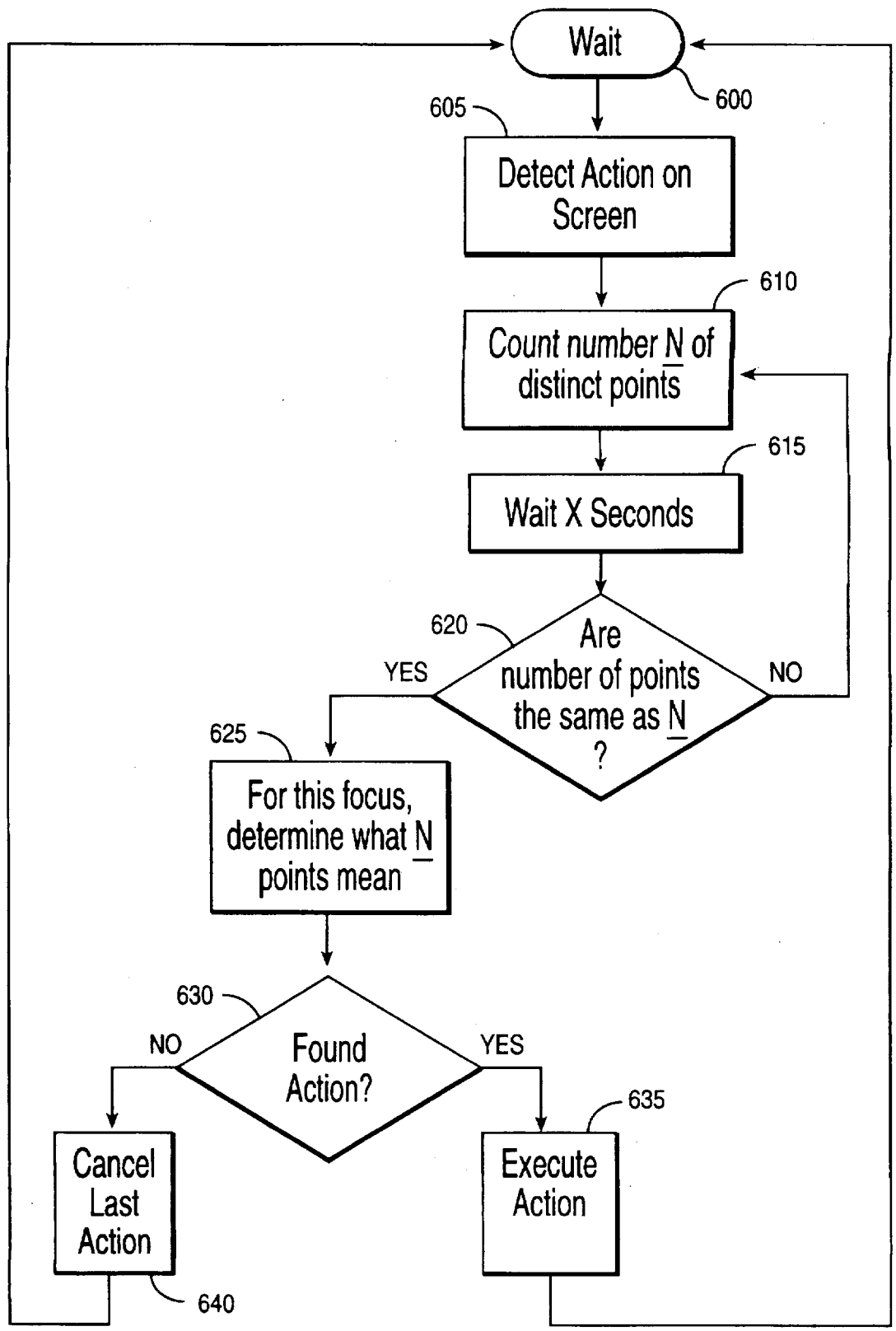
FIG. 6 illustrates detailed logic in the form of a flowchart for performing the steps in accordance with the present invention.

FIG. 6 illustrates a flow chart containing detailed logic for implementing the preferred embodiment. At 600, touchpad 200 waits to detect sound/heat/pressure, etc., from one or more fingers/thumb (or object). In response to the user placing one or more fingers/thumb on touchpad 200, at 605, touchpad 200 detects the sound pattern of the user's fingers. Alternatively, a unique object (e.g., stylus) could be substituted for the detection of the fingerprints. When touchpad 200 detects one or more fingerprints, at 610, the OS counts the number of distinct fingerprints. At 615, the OS waits a certain amount of time (e.g., 1 second). At 620, the OS re-counts the number of fingerprints on touchpad 200 and compares that number to the previous number counted at 610. If the count is different, control returns to 610. If the count is the same, at 625, the OS determines what function should be invoked based on the number of points (e.g., fingerprints) counted. To do this, the OS examines a look up table (not shown) at 630. If the number of counts is found in the look-up table, at 635, the action associated with the counted points is invoked. If the action is not found, at 640, the previous action, if any, is cancelled and control returns to 600.

While the invention has been shown and described with reference to a particular embodiment thereof, it will be understood by those skilled in the art that the foregoing and other changes in form and detail may be made therein without departing from the spirit and scope of the invention, only defined by the appended claims. For example, while the invention has been described as displaying drop-down menus in response to the appropriate number of fingers being placed on a touchpad, any type of action/selection could be made, such as sending a document to a particular printer.

What is claimed is:

1. A method for directing a computer system, having at least a touchscreen device to execute at least one action, comprising the steps of:

(a) detecting at least one item placed on the touchscreen device;

(b) counting the number of items placed on the touchscreen device;

(c) determining if an associated action corresponds to the numbers of items and displaying at least one number on the touchscreen device indicating the number of items required to be placed on the touchscreen device to invoke the associated action; and (d) if an associated action corresponds to the number of items, executing the associated action.

2. The method according to claim 1 wherein step (a) comprises the step of:

detecting sound, heat, or pressure from at least one finger of a hand.

3. The method according to claim 1 wherein the touchscreen device comprises a touchscreen.

4. The method according to claim 1 wherein the touchscreen device comprises a touchpad.

5. The method according to claim 1 wherein step (b) comprises the step of:

counting the number of fingers and/or thumb placed on the touchscreen device.

6. The method according to claim 5, further comprising the step of:

displaying at least one number on a display device, wherein the number corresponds to the number of fingers and/or thumb required to be placed on a touchpad to invoke the action.

7. The method according to claim 1 further comprising the step of:

if an associated action does not correspond to the number of items, cancelling a previous action.

8. A computer system having at least a touchscreen device for executing at least one action comprising:

(a) means for detecting at least one item placed on the touchscreen device;

(b) means for counting the number of items placed on the touchscreen device;

(c) means for determining if an associated action corresponds to the numbers of items and for displaying at least one number on the touchscreen device indicating the number of items required to be placed on the touchscreen device to invoke the associated action; and (d) if an associated action corresponds to the number of items, means for executing the associated action.

9. The system according to claim 8 further comprising:

means for detecting sound, heat, or pressure from at least one finger of a hand.

10. The system according to claim 8 wherein the touchscreen device comprises a touchscreen.

11. The system according to claim 8 wherein the touchscreen device comprises a touchpad.

12. The system according to claim 8 further comprising:

means for counting the number of fingers and/or thumb placed on the touchscreen device.

13. The system according to claim 12 further comprising:

means for displaying at least one number on a display device, wherein the number corresponds to the number of fingers and/or thumb required to be placed on a touchpad to invoke the action.

14. The system according to claim 8 further comprising:

if an associated action does not correspond to the number of items, means for cancelling a previous action.

15. An article of manufacture, comprising:

a computer usable medium having computer readable program code means embodied therein, the computer readable program code means in the article of manufacture comprising:

computer readable program code means for causing a computer system, having at least a touchscreen, to execute at least one action;

computer readable program code means for causing a computer system, having at least a touchscreen, to detect at least one item placed on the touchscreen device;

computer readable program code means for causing a computer system to count the number of items placed on the touchscreen device and for displaying at least one number on the touchscreen device indicating the number of items required to be placed on the touchscreen device to invoke an associated action; and computer readable program code means for causing a computer system to determine if an associated action corresponds to the numbers of items, in response to an associated action corresponding to the number of items, execute the associated action.

* * * * *